Dec. 10, 1968  C. O. LEYDIG ET AL  3,415,046
TREE TOPPER WITH DOUBLE MAIN BOOM AND DOUBLE CLEAN-UP BOOM
Filed Aug. 8, 1966  3 Sheets-Sheet 2

INVENTORS
CLYDE O. LEYDIG
MELVIN O. LANGFORD
BY
William R. Piper
ATTORNEY

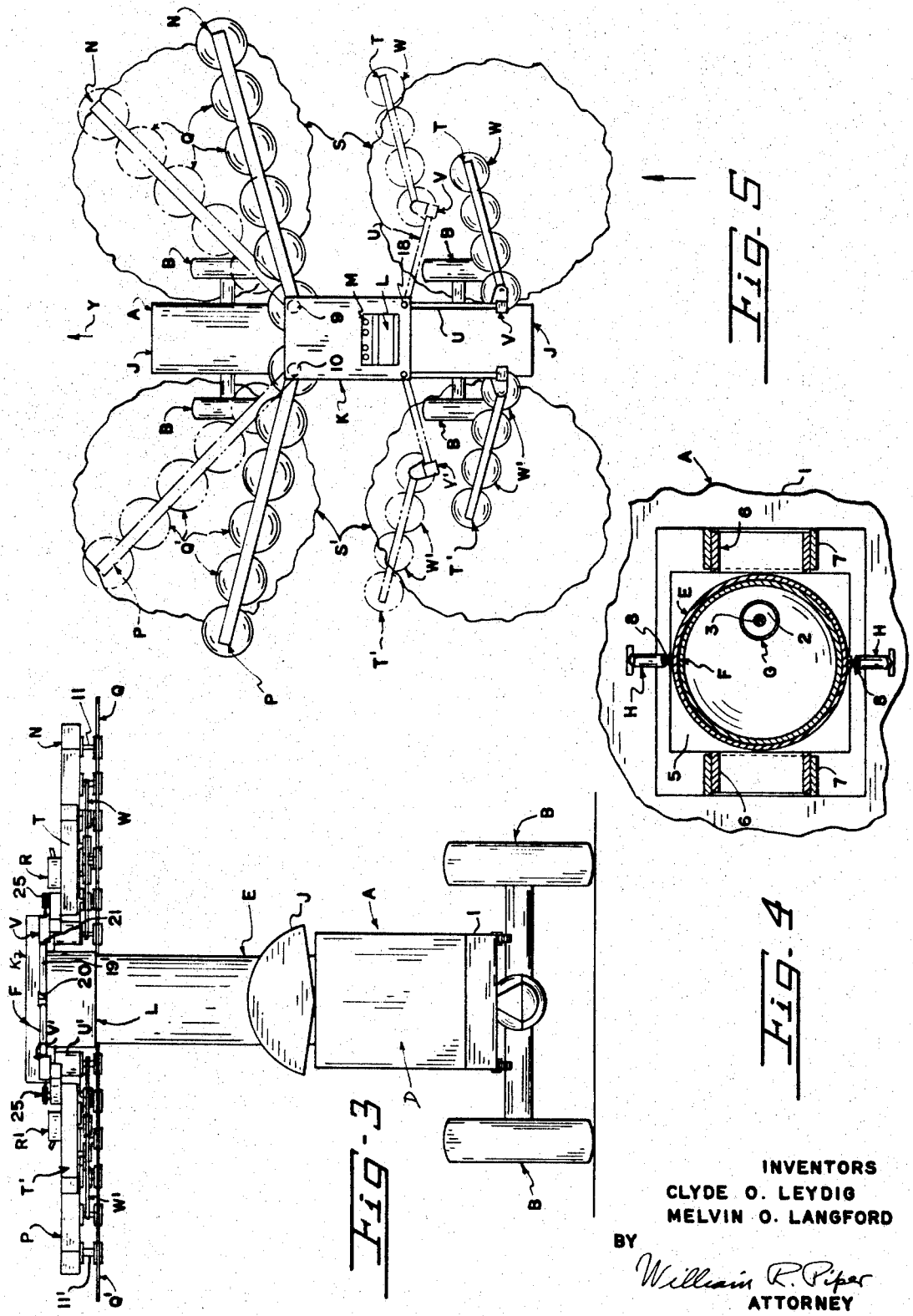

United States Patent Office 3,415,046
Patented Dec. 10, 1968

3,415,046
TREE TOPPER WITH DOUBLE MAIN BOOM
AND DOUBLE CLEAN-UP BOOM
Clyde O. Leydig and Melvin O. Langford, both of
P.O. Box 276, Exeter, Calif. 93221
Filed Aug. 8, 1966, Ser. No. 570,942
9 Claims. (Cl. 56—235)

The present invention relates to improvements in a tree topper with double main boom and double clean-up boom, and it consists in the combination, construction and arrangement of parts as hereinafter described and claimed.

An object of our invention is to provide a device of the type described that is an improvement over Patent No. 3,157,016, issued Nov. 17, 1964, on a tree topper with reciprocating cutter boom; and is an improvement over Patent No. 3,214,895, issued Nov. 2, 1965, on a tree topper with telescoping tower and oscillating boom. In Patent No. 3,157,016, there was disclosed a tower that could swing from substantially a horizontal position into a vertical position. The free end of the tower carried a reciprocating cutter boom that was always held in a horizontal position and could be swung from an inoperative position which was in alignment with the length of the supporting tractor, into an operating position where the cutter boom extended laterally from the tractor and into the line of a row of trees that were to be topped. The rotating cutting discs on the boom would trim the tops of the trees but there would be some branches that would bend slightly during the cutting operation and then when the cutter boom had passed, these branches would swing back into normal position and would project above the other cut branches. This required the operator to make another pass along the row of trees and to use the cutter boom a second time to cut the branches that had not previously been cut to the desired extent.

In Patent No. 3,214,895, there was disclosed a vertical telescoping tower mounted on a tractor and carrying an oscillating boom at its top. Again it required the operator to make two passes along a single row of trees to top them properly rather than make a single tree topping operation along the row.

The present invention is also an improvement over our copending application on a tree topping machine with main and clean-up disc saw-carrying booms, Ser. No. 496,779, filed Oct. 18, 1965. In that case the main boom extended from one side of the tractor for topping a row of trees and the clean-up boom extended from the opposite side of the tractor for cleaning up the adjacent row of trees that had previously been topped by the main cutter boom on the previous pass of the tractor along this row. In our present invention, we show a main cutter boom and a cooperating clean-up cutter boom projecting from the same side of the tractor for topping the trees in one row. We also show another main cutter boom and another cooperating clean-up cutter boom projecting from the opposite side of the tractor for topping the trees in an adjacent row to the first one. This permits an operator to drive the tractor only a single time between two adjacent rows of trees and to top the trees in both rows at the same time with the two main cutting booms and then immediately cause the clean-up booms on both sides of the tractors to cut any branches that might have not been cut down to the proper height by the main cutter booms. All of this is accomplished by a single pass of the tractor as it moves along the runway provided between the two adjacent rows of trees. No second tree-topping pass of the tractor along the same runway is necessary.

The telescoping tower can lift the main cutting booms and the clean-up cutting booms to the desired height above the ground. The operator can then swing the booms from their inoperative positions where their lengths parallel the length of the tractor into operative positions where the main booms and clean-up booms project laterally from both sides of the tractor. The plane of the disc saws in the clean-up cutting booms is disposed slightly above the plane of the disc saws in the main booms. The main cutting booms are made long enough to have their outer ends extend entirely across the diameters of the trees in both rows of trees that lie adjacent to both sides of the tractor. Also the clean-up cutting booms can be extended laterally so that their outer ends will reach just beyond the centers of the trees in the two rows that lie adjacent to the tractor sides. We have mounted the clean-up cutting booms on arms that can be swung laterally beyond the tractor sides so that the outer ends of the booms will extend entirely across the diameters of the trees in both rows instead of extending just beyond the tree centers. It is possible to tilt the tower laterally on the tractor so that the saws on the booms can cut in horizontal planes while the tractor can travel over an inclined ground surface.

Other objects and advantages will appear as the specification continues. The novel features of the invention will be set forth in the appended claims.

Drawings

For a better understanding of our invention, reference should be made to the accompanying drawings, forming part of this specification, in which:

FIGURE 1 is a side elevation of a tractor with a central telescoping vertical tower, the latter supporting two main disc saw carrying booms and two disc saw carrying clean-up booms.

FIGURE 2 is a top plan view of FIGURE 1 and illustrates the two main booms partially swung into operative position where they will project laterally from both sides of the tractor. The clean-up booms are mounted on the free ends of swingable arms which in turn are carried by the tractor. The clean-up booms are shown extending laterally from the boom carrying arms and also extending laterally from the tractor sides.

FIGURE 3 is a rear elevation of the device when looking in the direction of the arrows 3—3 in FIGURE 1.

FIGURE 4 is an enlarged horizontal section through the telescoping boom-carrying tower and is taken along the line 4—4 of FIGURE 1.

FIGURE 5 is a top plan schematic view illustrating the tractor moving between two adjacent rows of trees and having its main cutting booms and clean-up cutting booms extending laterally from both sides of the tractor for topping the trees in both rows at the same time.

While we have shown only the preferred form of our invention, it should be understood that various changes, or modifications, may be made within the scope of the annexed claims without departing from the spirit thereof.

Detailed description

In carrying out our invention, we make use of a tractor indicated generally at A. The tractor is supported by wheels B and two of these may be used for steering the tractor. We do not show the steering mechanism for the tractor nor do we show where the operator sits in the vehicle for guiding it because this forms no part of our invention. A tractor engine, not shown, may be enclosed in the housing C, in FIGURE 1, and the housing D may enclose the engine and pumps for operating the hydraulic motors hereinafter described. The tractor engine could operate the hydraulic motors if desired.

Figure 1:
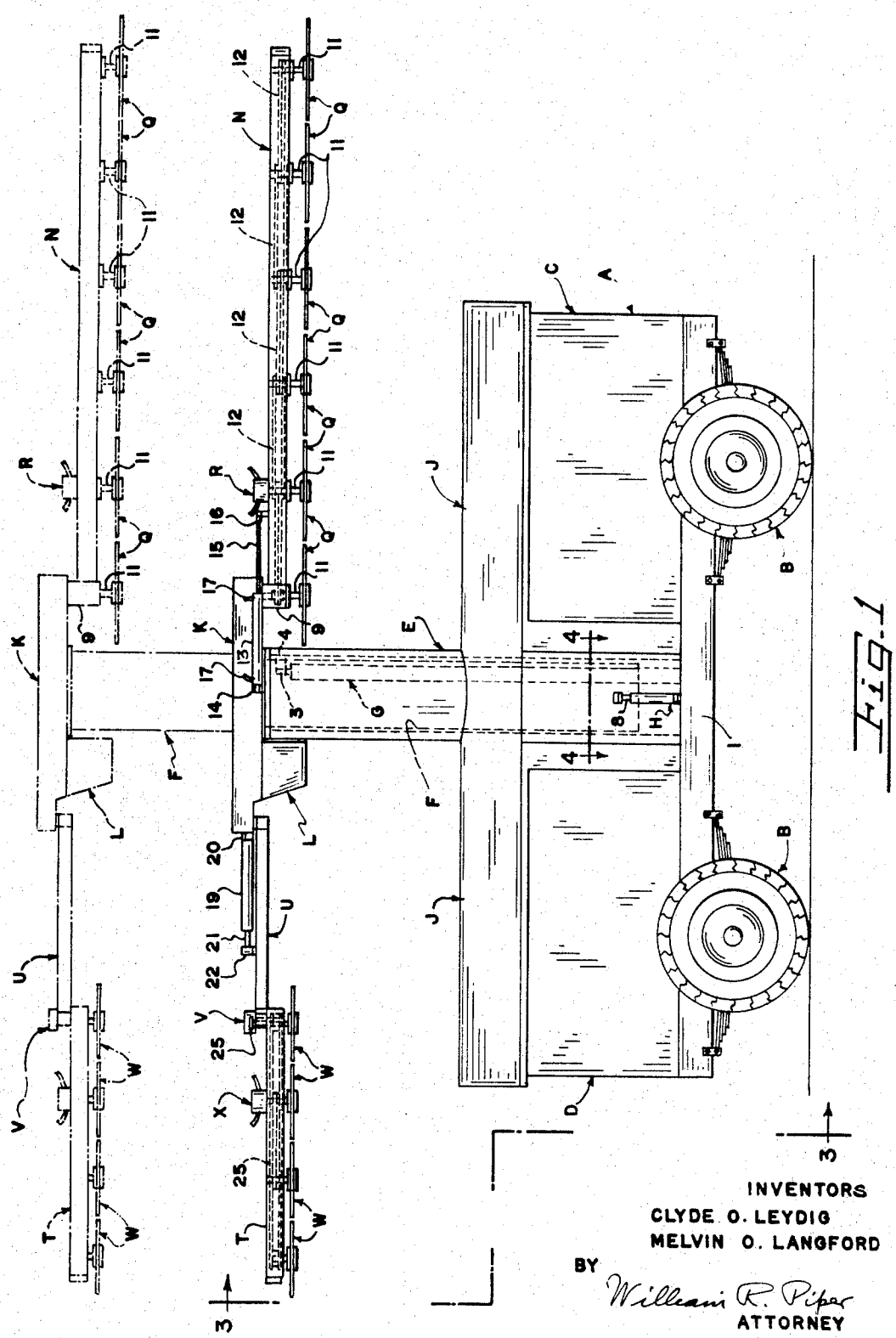

A telescoping tower E preferably extends vertically from and is supported by the chassis 1 of the tractor, see FIGURE 1. The tower E has a telescoping inner cylindrical section F shown partially extended by the dash double dot lines in the same figure. Any desired mechanism may be used for raising and lowering the inner section F, such as the mechanism shown in FIGURES 3 and 5 in Patent No. 3,214,895, excepting that the section F does not have to be rotatably mounted in the tower section E. Means, not shown, may be used for permitting vertical movement of the section F in the tower E while preventing rotation of the section F with respect to the casing or tower section E.

In the present case we show a hydraulic cylinder G in FIGURES 1 and 4 that is disposed within the vertically movable inner tower section F. A piston 2 and piston rod 3 are slidably mounted in the cylinder G, and the upper end of the piston rod is connected to the telescoping section F, by a connecting member 4. Hydraulic lines, not shown, are connected to opposite ends of the cylinder G for moving the piston and piston rod in both directions. The bottom of the outer cylindrical casing of the telescoping tower E rests on a base 5, see FIGURE 4. The base has cylindrical trunnions 6—6 whose common axes extend in the direction of the length of the tractor. The trunnions are rotatably mounted in aligned bearings 7—7 that in turn are secured to the chassis 1 of the tractor. Any other means for pivotally supporting the base for the telescoping tower E may be used so as to permit a lateral tilting of the tower on the tractor chassis 1.

One means for tilting the telescoping tower E laterally is shown in FIGURES 1 and 4. A pair of hydraulic cylinders H—H are disposed on opposite sides of the outer tower casing E and have their lower ends pivotally mounted on the tractor chassis 1. Pistons, not shown, are slidably mounted in the cylinders H—H and they have piston rods 8—8 that project from the tops of the cylinders and are pivotally connected to the sides of the telescoping tower E. Hydraulic lines, not shown, lead to both ends of both cylinders H—H, and the operator can control the flow of fluid under pressure to the cylinders for tilting the telescoping tower E to the desired extent with respect to the tractor.

The outer cylindrical casing of the tower E, carries a hood J that preferably extends over the two housings C and D in FIGURE 1, to protect them from falling branches or to protect any other mechanism on the tractor chassis. If desired the hood J could be provided with two roll bar hood cleaners of the type shown in our copending case, Ser. No. 496,779.

Figure 2:
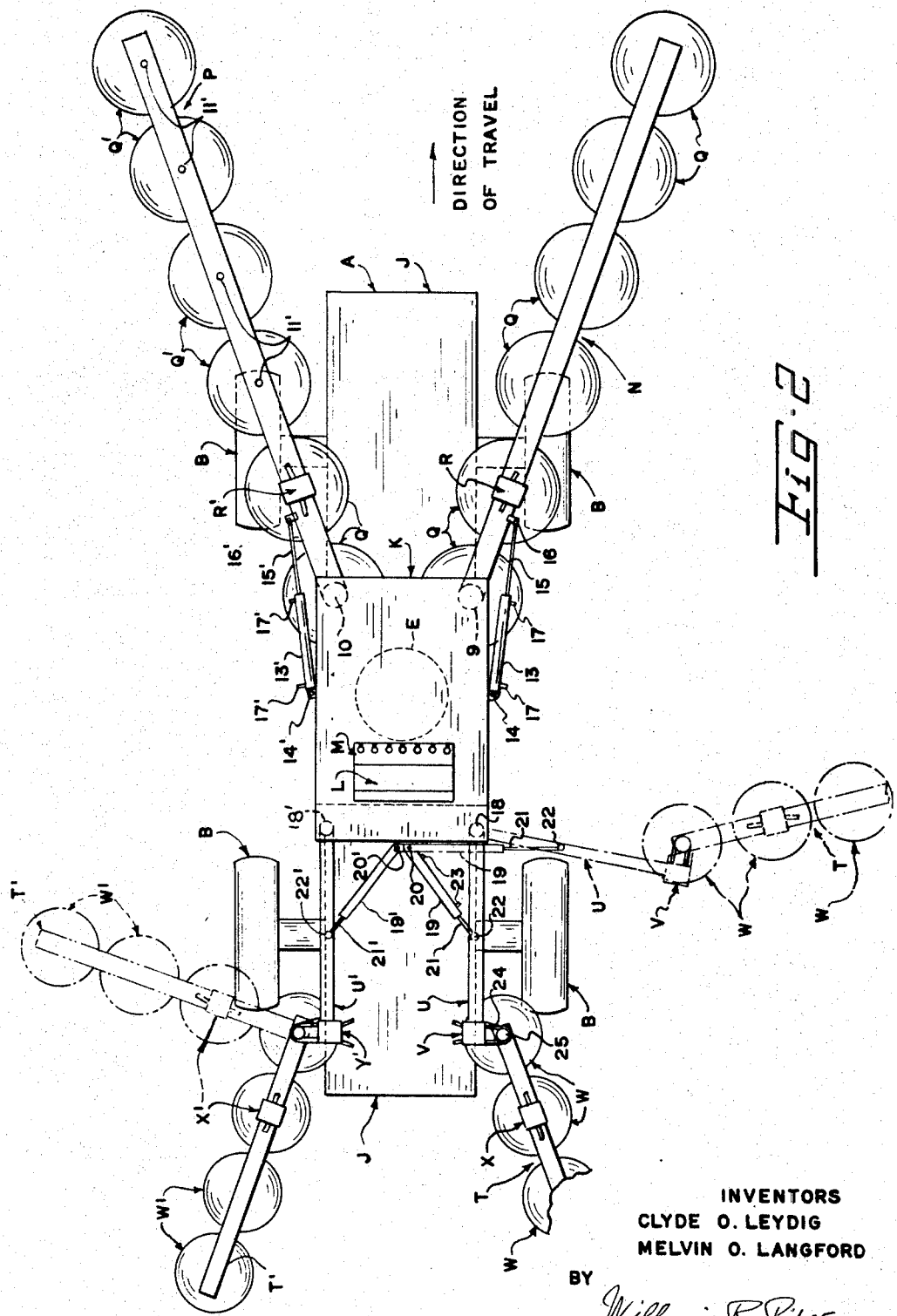

The top of the telescoping inner cylindrical section F of the tower E, supports a work platform indicated generally at K in FIGURES 1, 2, 3 and 5. The platform has an operator's seat L and control levers M are positioned in front of the seat so that the operator can control the movements of the main and clean-up cutter booms now to be described. In FIGURE 2, we show two main cutter booms N and P that are pivotally secured to the work platform K at 9 and 10 respectively. The main cutter boom N is pivotally mounted near the front right hand corner of the work platform K and it rotatably carries a plurality of disc saws Q that are arranged in a row and are spaced a slight distance apart from each other as shown in FIGURES 1 and 2. The disc saws Q depend below the main boom N and lie in a horizontal plane. Any means may be used for rotating the disc saws and we have shown a hydraulic motor R for accomplishing this. The saws are mounted on shafts 11 and the latter are rotatably carried by the main boom N and are operatively connected together by bolts and pulleys indicated generally at 12.

The main cutter boom N may be swung from an inoperative position where its length would parallel the length of the tractor A, into an operative position where it will extend laterally from the right hand side of the tractor as shown in FIGURE 2. In FIGURE 5 the main cutter boom N is illustrated in two different operative positions, one in full lines and the other in dot-dash lines. The cutter boom N overlies the top of a tree S that is one in a row of trees that lie just to the right of the tractor A. Hydraulic means is used for swinging the main cutter boom N from inoperative position into the desired angular position. In FIGURES 1 and 2, we show a hydraulic cylinder 13 with one end pivoted at 14 to the platform K. A piston rod 15 extends from the free end of the cylinder 13 and has its outer end pivotally connected at 16 to the main boom N. Hydraulic lines 17 communicate with opposite ends of the cylinder 13 and are connected to hydraulic mechanism, not shown, that is controlled by certain of the levers M by the operator sitting in the seat L. The operator also has control by certain of the levers M for raising the platform K and main boom N to the desired height by means of the hydraulic cylinder G and the telescoping tower E.

The other main cutter boom P is pivotally mounted near the front left hand corner of the work platform K, see FIGURE 2, and it rotatably carries a plurality of disc saws Q'. The disc saws Q' are the same as the disc saws Q and the hydraulic mechanisms for swinging the main cutter boom P and operating the saws Q' are similar to that already described for the main cutter boom N and like reference letters and numerals for similar parts will be used but they will be primed. The operator while in the seat L in the work platform K, can control the movements of the main cutter booms N and P, independently of each other. FIGURE 5 shows both main cutter booms N and P in different operative positions. The disc saws Q on the cutter boom N can reach across the entire diameter of each tree S in the row of trees on the right hand side of the tractor while the disc saws Q' on the main cutter boom P can reach across the entire diameter of each tree S' in the row of trees on the left hand side of the tractor.

As previously stated, the disc saws Q and Q' on the main booms N and P will top the trees S and S' at the desired height, but sometime the weight of the cut material or some branches themselves may bend slightly during this cutting operation. Then when the main booms complete their cut, these slightly bent branches will spring back into normal position and will project above the other branches that have been properly cut. This may present an unsightly appearance and would normally require the operator to make a second run or pass along the row of trees in order to complete the trimming of the tree tops properly.

To overcome this we have provided the clean-up cutter booms, one for each of the main booms. In our copending application, Ser. No. 496,779, we show a clean-up cutter boom, but this boom extends from the opposite side of the tractor to that of the main cutter boom. In the present case a clean-up cutter boom T is associated with the main boom N and is swingably connected to the outer end of an arm U which in turn has its inner end pivotally connected to the right rear corner of the work platform K, at 18, see FIGURE 2. A hydraulic cylinder 19 has one end pivoted at 20 to the rear of the work platform K and a piston rod 21 extends from the free end of the cylinder and has its outer end pivotally secured at 22 to the arm U. Hydraulic lines 23 communicate with both ends of the cylinder 19 and the operator in the seat L can operate certain levers M for causing fluid to flow into the cylinder 19 for swinging the arm U from the full to the dotted line position in FIGURE 2.

The clean-up cutter boom T has its inner end mounted on a support that is carried by the outer end of the arm U, see FIGURES 1, 2 and 3. A hydraulically actuated boom-swinging device indicated generally at V, is carried by the arm U and has a chain 24 passed around a sprocket 25 on the clean-up boom T for swinging the boom with respect to the arm when the operator directs fluid under pressure into the boom swinging device V. FIGURE 5 indicates how the arm U can be swung from the full to the dash double dot line position and how the hydraulic device V can swing the clean-up cutter boom with respect to the arm as indicated by the dash double dot line position of the boom.

The clean-up cutter boom T rotatably carries a plurality of disc saws W that are mounted on shafts, see FIGURE 1, that in turn are mounted in the clean-up cutter boom so that the saws depend below the boom. In actual practice the plane for the clean-up cutter boom saws W is spaced two or three inches above the plane for the main cutter boom saws Q so as to prevent the clean-up cutter boom saws from taking a full cut across the tops of the tress. The rear view shown in FIGURE 3 clearly shows the plane of the disc saws W being disposed higher than the plane of the disc saws Q.

A hydraulic motor X is mounted on the clean-up cutter boom T, see FIGURES 1 and 2 and endless belts and pulleys 25 interconnect the shafts that carry the disc saws W. The operator in the seat L can actuate certain of the levers M for causing the motor X to rotate the disc saws.

The main cutter boom P has a clean-up cutter boom T' associated therewith on the same side of the tractor and the boom T' is similar to the clean-up cutter boom T and is mounted on the free end of an arm U' that is similar to the arm U, shown in FIGURE 2. The arm U' is swung by a hydraulic cylinder 19' and associate parts that are similar to the hydraulic cylinder 19 and its associate parts. The same letters and numbers for parts that operate the arm U' and the clean-up cutter boom T' are used where these parts correspond to similar parts that operate the arm U and the clean-up cutter boom T, except that the letters and numbers will be primed for the parts associated with the arm U' and boom T'.

*Operation*

From the foregoing description of the various parts of the device, the operation thereof may be readily understood. When the tractor A is being transported from one place to another, the main cutter booms N and P will extend in a straight forward direction so that the lengths of these booms will parallel the length of the tractor. Also in traveling position, the arms U and U' will extend straight back so that the lengths of these arms will parallel the length of the tractor. The clean-up cutter booms T and T' which are carried at the free ends of the arms U and U' can either extend straight back or they can be swung forwardly so as to substantially parallel the arms when the tractor is being transported.

FIGURE 5 shows the device being used for topping trees S and S' that are in two parallel rows of trees between which the tractor A moves. An arrow Y indicates the direction of movement. There can be an operator for driving the tractor who could sit on a seat, not shown, disposed under the hood J. This operator could have a duplicate set of control levers, not shown, that would be similar to the control levers M in FIGURE 2. It is possible to have a single operator occupy the seat L, and control the movement and operation of the tractor, cutter booms, etc., from this position. In this event an auxiliary steering wheel, not shown, would be positioned in front of the seat L and by means of which the tractor could be steered.

It is possible for the operator in the seat L to actuate certain control levers M and cause the main booms N and P to swing into operative position so as to extend across the tops of the trees S and S' that are to be topped. The telescoping tower E has lifted the platform K to the height desired so that the disc saws Q and Q' will top the trees as the tractor moves between the two rows of trees. FIGURE 5 shows the main cutter booms N and P in two different angular positions for topping the trees.

The operator can also swing the clean up cutter booms T and T' into angular positions so that they will project laterally from the arms U and U' as shown in FIGURE 5. It is further possible to swing the arms U and U' outwardly into angular positions and thus extend the clean-up cutter booms T and T' farther across the tops of the trees. The disc saws Q and Q' on the main cutter booms N and P will do the initial cutting to top the trees at the desired height. The clean-up cutter booms T and T' will follow and their disc saws W and W' will cut any branches of the trees that have not been properly cut by the main cutter boom saws. As already stated the saws on the clean-up cutter booms cut at a slightly higher level than the main cutter boom saws.

If the tractor is moving over inclined ground where the right wheels B in FIGURE 3 might be at a higher elevation than the left wheels, the operator can use the hydraulic cylinders H for tilting the telescoping tower E and base 5 on the truck chassis so as to bring the tower axis into a vertical position. The present device makes it possible for the tractor to move along between two adjacent rows of trees and properly top the trees in both rows without the necessity of moving between the same two rows of trees a second time. In an orchard where there are a number of parallel rows of trees, the tractor can be moved along every second path between rows of trees rather than move through each successive path. Time and labor costs can thus be saved in the topping of the trees.

We claim:
1. In a device of the type described:
 (a) a vehicle;
 (b) a tower supported by said vehicle;
 (c) a main boom operatively supported by said tower;
 (d) disc saws rotatably carried by said boom and having their peripheral cutting edges lying in a plane substantially paralleling the ground surface over which the vehicle travels;
 (e) means for swinging said boom to extend to one side of said vehicle for positioning its saws so that they will extend over an area that lies on one side of said vehicle;
 (f) means for rotating said saws while moving the vehicle along a row of trees for topping them;
 (g) a clean-up boom operatively supported by said tower;
 (h) disc saws rotatably carried by said clean-up boom and having their peripheral cutting edges lying in a plane substantially paralleling the ground surface;
 (i) means for swinging said clean-up boom to extend to the same side of the vehicle as that occupied by said main boom for positioning its saws so that they will extend over the same row of trees; and
 (j) means for rotating the saws of said clean-up boom for causing them to top any branches in the row of trees that have not been properly cut by the saws on the main boom.

2. The combination as set forth in claim 1: and in which
 (a) said means for swinging said main boom being adapted to move it into a travelling position substantially paralleling the length of the vehicle; and
 (b) said means for swinging said clean-up boom being adapted to move it into a travelling position substantially paralleling the length of the vehicle.

3. The combination as set forth in claim 1: and in which
 (a) the operative support between the clean-up boom and said tower includes an arm having one end swingably supported by said tower and its other end pivotally connected to one end of said clean-up boom; and
 (b) said means for swinging said clean-up boom including means for swinging said arm with respect to said tower and including means for swinging said clean-up boom with respect to said arm.

4. In a device of the type described:
 (a) a vehicle movable between two parallel rows of trees;
 (b) a telescoping tower supported by said vehicle;
 (d) a platform adapted to be lifted by the telescoping tower and having front and rear ends;
 (e) a pair of main booms swingably supported near the front end of said platform;
 (f) disc saws rotatably carried by both of said booms and having their peripheral cutting edges lying in planes substantially paralleling the ground over which the vehicle travels;

(g) independent means for swinging each boom for extending them beyond opposite sides of the vehicle for positioning the saws so that they will extend over the trees in both rows to be topped;

(h) means for rotating the saws on both booms and for moving the vehicle so that said saws will top the trees in both rows simultaneously;

(i) a pair of clean-up booms swingably supported near the rear end of said platform;

(j) disc saws rotatably carried by both of said clean-up booms and having their peripheral cutting edges lying in planes substantially paralleling the ground;

(k) independent means for swinging each clean-up boom for extending them beyond opposite sides of said vehicle and to the rear of said main booms for positioning the saws carried by these booms so that they will extend over the same two rows of trees that are being topped by the saws of the main booms; and (l) means for rotating the saws on both clean-up booms so that they will cut tree branches that have not been properly cut by the saws on the main booms.

5. The combination as set forth in claim 4: and in which (a) said means for swinging said main booms being adapted to move them into travelling positions substantially paralleling the length of the vehicle; and (b) said means for swinging said clean-up booms being adapted to move them into travelling positions substantially paralleling the length of the vehicle.

6. The combination as set forth in claim 4: and in which (a) the operative supports between said clean-up booms and said platform includes an arm for each clean-up boom having one end swingably supported by said platform and its other end pivotally connected to one end of said clean-up boom; and (b) said independent means for swinging said clean-up booms including means for swinging said arms independently of each other and including means for swinging said clean-up booms with respect to their supporting arms and independently of each other.

7. The combination as set forth in claim 4: and in which (a) means is provided for tilting said tower laterally to a slight extent with respect to said vehicle.

8. The combination as set forth in claim 4: and in which (a) said platform has an operator's seat; and (b) control means placed near said seat and connected to said means for operating said telescoping tower and said main and clean-up booms;

(c) whereby an operator sitting in said seat can control the raising and lowering of said platform with its booms and can independently control the movements of said main and clean-up booms.

9. The combination as set forth in claim 6: and in which (a) said platform has an operator's seat; and (b) control means placed near said seat and connected to said means for operating said telescoping tower and to said means for operating said main booms, said arms and said clean-up booms;

(c) whereby an operator sitting in said seat can control the raising and lowering of said platform with its booms and arms and can independently control the movements of said main and clean-up booms and the arms supporting said clean-up booms.

References Cited

UNITED STATES PATENTS

| | | | |
|---|---|---|---|
| 2,926,480 | 3/1960 | Kimball | 56—235 |
| 3,157,016 | 11/1964 | Leydig et al. | 56—235 |
| 3,214,895 | 11/1965 | Leydig et al. | 56—235 |
| 3,246,460 | 4/1966 | Patterson et al. | 56—235 |
| 3,330,068 | 7/1967 | Carson | 56—235 XR |

RUSSELL R. KINSEY, *Primary Examiner.*